United States Patent
Takase et al.

(10) Patent No.: US 10,280,819 B2
(45) Date of Patent: May 7, 2019

(54) HONEYCOMB-TYPE HEATING DEVICE AND METHOD OF USING SAME

(71) Applicant: NGK INSULATORS, LTD., Nagoya (JP)

(72) Inventors: Naoya Takase, Nagoya (JP); Yoshiyuki Kasai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/962,057

(22) Filed: Apr. 25, 2018

(65) Prior Publication Data

US 2018/0238210 A1    Aug. 23, 2018

Related U.S. Application Data

(63) Continuation of application No. PCT/JP2016/077820, filed on Sep. 21, 2016.

(30) Foreign Application Priority Data

Nov. 16, 2015 (JP) .................................. 2015-224133

(51) Int. Cl.
*F01N 3/20* (2006.01)
*F01N 3/027* (2006.01)
(Continued)

(52) U.S. Cl.
CPC ........... *F01N 3/027* (2013.01); *F01N 3/0222* (2013.01); *F01N 3/035* (2013.01); *F01N 3/2013* (2013.01);
(Continued)

(58) Field of Classification Search
CPC ........... F01N 3/0222; F01N 3/027; F01N 3/28
(Continued)

(56) References Cited

U.S. PATENT DOCUMENTS 5,238,650 A * 8/1993 Sheller .................. F01N 3/2026
219/205
5,264,186 A * 11/1993 Harada .................. F01N 3/2026
422/171
(Continued)

FOREIGN PATENT DOCUMENTS

JP    H11-013459 A1    1/1999
JP    2010-229976 A1    10/2010
(Continued)

OTHER PUBLICATIONS

International Search Report and Written Opinion (Application No. PCT/JP2016/077820) dated Nov. 8, 2016.

*Primary Examiner* — Tom P Duong
(74) *Attorney, Agent, or Firm* — Burr & Brown, PLLC

(57) ABSTRACT

A honeycomb-type heating device includes a pillar-shaped honeycomb substrate that has partition walls defining a plurality of cells and that has a circumferential wall surrounding the partition walls; a plurality of heaters adjacently arranged on a circumferential face in a circumferential direction of the circumferential face that is an outer surface of the circumferential wall; a coated wire electrically connecting the plurality of heaters; and a metal case housing the honeycomb substrate and the plurality of heaters. Each of the plurality of heaters has an electrode for energization and is a resistance heating type heater that generates heat due to energization, the metal case has hole parts for protruding the electrodes of respective heaters to the outside of the metal case, and the coated wire electrically connects, outside the metal case, the electrodes of respective heaters protruding to the outside of the metal case from the hole parts.

15 Claims, 4 Drawing Sheets

(51) Int. Cl.
   *F01N 3/24*    (2006.01)
   *F01N 3/035*   (2006.01)
   *F01N 3/28*    (2006.01)
   *F01N 13/00*   (2010.01)
   *F01N 3/022*   (2006.01)
   *B01D 53/94*   (2006.01)
   *B01J 27/224*  (2006.01)
   *B01J 35/00*   (2006.01)

(52) U.S. Cl.
   CPC ............. *F01N 3/2026* (2013.01); *F01N 3/24* (2013.01); *F01N 3/28* (2013.01); *F01N 3/2889* (2013.01); *F01N 13/00* (2013.01); *B01D 53/9495* (2013.01); *B01D 2255/1021* (2013.01); *B01D 2255/1023* (2013.01); *B01D 2255/1025* (2013.01); *B01D 2257/404* (2013.01); *B01D 2257/502* (2013.01); *B01D 2257/702* (2013.01); *B01J 27/224* (2013.01); *B01J 35/0033* (2013.01); *F01N 2240/16* (2013.01); *Y02T 10/26* (2013.01)

(58) Field of Classification Search
   USPC .................................................. 422/174, 180
   See application file for complete search history.

(56) References Cited

U.S. PATENT DOCUMENTS

| | | | | |
|---|---|---|---|---|
| 9,017,615 | B2* | 4/2015 | Yoshioka | F01N 3/2871 |
| | | | | 422/174 |
| 9,121,322 | B2* | 9/2015 | Watanabe | F01N 3/2026 |
| 2011/0305601 | A1* | 12/2011 | Kawase | F01N 3/2026 |
| | | | | 422/109 |
| 2012/0076698 | A1* | 3/2012 | Ishihara | B01D 53/00 |
| | | | | 422/174 |
| 2013/0224080 | A1* | 8/2013 | Ishihara | H05B 3/06 |
| | | | | 422/174 |
| 2013/0287378 | A1* | 10/2013 | Kida | H05B 3/141 |
| | | | | 392/465 |
| 2014/0037511 | A1 | 2/2014 | Hashimoto | |
| 2016/0243500 | A1* | 8/2016 | Omiya | F01N 3/2013 |

FOREIGN PATENT DOCUMENTS

| | | |
|---|---|---|
| JP | 2010-229977 A1 | 10/2010 |
| JP | 2011-194323 A1 | 10/2011 |
| JP | 2012-061449 A1 | 3/2012 |
| JP | 2013-238116 A1 | 11/2013 |
| JP | 2014-129890 A1 | 7/2014 |
| JP | 2015-075068 A1 | 4/2015 |
| JP | 2015-081531 A1 | 4/2015 |
| WO | 2012/137577 A1 | 10/2012 |

\* cited by examiner

HONEYCOMB-TYPE HEATING DEVICE AND METHOD OF USING SAME

TECHNICAL FIELD

The present invention relates to a honeycomb-type heating device provided in an exhaust path of exhaust gas emitted from an engine of an automobile or the like, for raising a temperature of a catalyst for purifying the exhaust gas up to the active temperature of the catalyst at an early stage, and to its use method.

BACKGROUND ART

A honeycomb structure into which a catalyst is loaded is conventionally used for purification treatment of a toxic substance, such as HC, CO, or $NO_x$, included in exhaust gas emitted from an engine of an automobile or the like. When the catalyst loaded into the honeycomb structure treats the exhaust gas in this manner, it is required to raise a temperature of the catalyst up to the active temperature of the catalyst. However, when the engine starts, there is a problem that the exhaust gas is insufficiently purified because the catalyst has not reached the active temperature. Particularly, since the traveling by a plug-in hybrid vehicle (PHEV) or a hybrid vehicle (HV) includes traveling by only a motor, the frequency of starting the engine is low and the temperature of the catalyst is low when the engine starts. As a result, the performance of purifying the exhaust gas immediately after the engine starts easily degrades.

In order to solve the above problem, there has been proposed an electrically heated catalyst (EHC) in which an electrode is disposed in a honeycomb structure formed by conductive ceramics and then energization causes the honeycomb structure itself to generate heat to make it possible to raise a temperature up to an active temperature before an engine starts (see Patent Document 1).

There has been proposed another heating device in which a tubular resistance heating type heater is arranged so as to surround a circumferential wall of a honeycomb structure and heats a wall surface of the circumferential wall of the honeycomb structure to transmit the heat to an inner cell structure (see Patent Document 2).

CITATION LIST

Patent Documents

[Patent Document 1] JP-A-2010-229976
[Patent Document 2] JP-A-2013-238116

SUMMARY OF THE INVENTION

Problem to be Solved by the Invention

However, in a method in which energization causes the honeycomb structure itself to generate heat, a path of an electric current flowing inside the honeycomb structure varies to cause decrease of temperature and variation of temperature distribution by just a slight crack that occurs in the honeycomb structure due to, for example, vibrations. Thus, durability is not sufficient. Further, in this method, the honeycomb structure has a heat insulating material (holding material) wound around the circumference thereof and is used in a state of being housed in a tubular metal case. However, if the heat insulating material absorbs moisture (absorbs water), electrical leakage or short circuit may occur when the honeycomb structure is energized. That is, since water vapor remaining in an exhaust system condenses in the exhaust system after the engine is interrupted, if a water absorbing member like the heat insulating material exists in the exhaust system, moisture generated due to condensation tends to gather in the water absorbing member (heat insulating material). Then, when the heat insulating material absorbs the moisture, electrical insulating properties of the heat insulating material degrade, and as a result, electrical leakage or short circuit accident may occur due to the heat insulating material having absorbed water.

Meanwhile, in a method of arranging a tubular resistance heating type heater so as to surround the circumferential wall of a honeycomb structure, since the honeycomb structure is heated by the external heater, temperature variation of the honeycomb structure by a slight crack that occurs in the honeycomb structure due to, for example, vibrations is small. However, the tubular heater is easily damaged due to thermal stress. In addition, when the single (monolithic structure) resistance heating type heater is used for heating, the entire honeycomb structure is not heated at all if the heater is damaged and then energization cannot be performed.

As means for solving such a problem, a plurality of resistance heating type heaters may be arranged so as to surround the circumferential wall of the honeycomb structure. In this case, since the plurality of heaters are collectively energized, a connector for electrically connecting the plurality of heaters becomes necessary. If a high rigidity connector is used here, the connector strongly constrains the heaters. Hence, when the honeycomb structure is heated by the heaters, the difference in thermal expansion between the honeycomb structure and the plurality of heaters arranged around the honeycomb structure and connected by the connector generates a high stress between the honeycomb structure and the plurality of heaters. Then, as a result, breakage of the honeycomb structure or contact failure between the heaters and the connector occurs. On the other hand, if a low rigidity connector like the coated wire is used, force of constraint between the heaters by the connector becomes weak. Thus, the stress as described above may be relaxed, but such a low rigidity connector, since it generally has a small heat capacity, is easily fused by heat of the heaters.

The present invention has been made in view of the above-described circumstances, and an object thereof is to provide a honeycomb-type heating device in which even if a low rigidity connector is used for connection between a plurality of heaters surrounding a circumferential wall of a honeycomb structure (honeycomb substrate), the connector is hard to be fused, and its use method.

Means for Solving the Problem

To achieve the above object, according to the present invention, there are provided a honeycomb-type heating device and its use method described below.

[1] A honeycomb-type heating device including: a pillar-shaped honeycomb substrate that has partition walls defining and forming a plurality of cells extending from one end face to another end face, and that has a circumferential wall surrounding the partition walls; a plurality of heaters adjacently arranged on a circumferential face in a circumferential direction of the circumferential face that is an outer surface of the circumferential wall; a coated wire electrically connecting the plurality of heaters; and a metal case housing the honeycomb substrate and the plurality of heaters, wherein each of the plurality of heaters has an electrode for energization and is a resistance heating type heater that generates heat due to energization, the metal case has hole parts for protruding the electrodes of respective heaters to the outside of the metal case, and the coated wire electrically connects, outside the metal case, the electrodes of respective heaters protruding to the outside of the metal case from the hole parts.

[2] The honeycomb-type heating device according to [1], further including a cover provided so as to airtightly cover, at the outside of the metal case, at least a connecting portion of the electrode of each of the plurality of heaters and the coated wire and the hole part of the metal case.

[3] The honeycomb-type heating device according to [1] or [2], wherein the coated wire is provided with a stress relief part.

[4] The honeycomb-type heating device according to [3], wherein the stress relief part is a bent portion of the coated wire.

[5] The honeycomb-type heating device according to any one of [1] to [4], wherein a melting temperature of a conductor of the coated wire is 400° C. or more.

[6] The honeycomb-type heating device according to any one of [1] to [5], wherein the conductor of the coated wire is formed by any one kind of metal material selected from a group consisting of Ni, Ni-based alloy, and stainless steel.

[7] The honeycomb-type heating device according to any one of [1] to [6], wherein the honeycomb substrate is formed by a ceramic material having a thermal conductivity of 20 W/m·K or more.

[8] The honeycomb-type heating device according to any one of [1] to [7], wherein the plurality of heaters are electrically connected in series or in parallel and each have an electric resistance to allow application of a high voltage of 200 V or more.

[9] The honeycomb-type heating device according to any one of [1] to [8], wherein each of the plurality of heaters has an insulation function for preventing an electric current from flowing from each of the plurality of heaters to the honeycomb substrate.

[10] The honeycomb-type heating device according to any one of [1] to [9], wherein at a cross section orthogonal to a length direction of the honeycomb substrate, a center angle of each of the plurality of heaters arranged on the circumferential face of the honeycomb substrate is 180° or less.

[11] The honeycomb-type heating device according to any one of [1] to [10], wherein a thickness of the circumferential wall is larger than a thickness of the partition walls.

[12] The honeycomb-type heating device according to any one of [1] to [11], wherein the honeycomb substrate has a stress relief formed therein.

[13] The honeycomb-type heating device according to any one of [1] to [12], wherein a catalyst for purifying exhaust gas is loaded into the honeycomb substrate.

[14] A method of using a honeycomb-type heating device (first use method), using the honeycomb-type heating device according to any one of [1] to [13] under a temperature condition that a temperature of the coated wire is 600° C. or less.

[15] A method of using a honeycomb-type heating device (second use method), including: installing the honeycomb-type heating device according to [13] in an exhaust path of exhaust gas emitted from an engine; and raising a temperature of the honeycomb substrate into which a catalyst for purifying exhaust gas is loaded up to a catalyst active temperature of the catalyst or more by causing each of the plurality of heaters to generate heat by starting energization to each of the plurality of heaters before the engine starts.

Effect of the Invention

In a honeycomb-type heating device of the present invention, the plurality of heaters adjacently arranged on the circumferential face of the honeycomb substrate are connected outside the metal case where the temperature is low compared with the inside of the metal case. Hence, even if a coated wire having a small heat capacity is used as the connector for the connection, the coated wire (connector) is hard to be fused by heat of the heaters. Further, since the coated wire has a low rigidity, force of constraint between the heaters by the coated wire is weak. Hence, when the honeycomb substrate is heated by the heaters, the difference in thermal expansion between the honeycomb substrate and the plurality of heaters connected by the coated wire (connector) can relax a stress generated between the honeycomb substrate and the plurality of heaters. Then, as a result, it is possible to prevent breakage of the honeycomb substrate or contact failure between the heaters and the connector due to the stress.

Additionally, according to a method of using the honeycomb-type heating device of the present invention (first use method), since the honeycomb-type heating device of the present invention is used under a temperature condition that the temperature of the coated wire is 600° C. or less, the coated wire is hard to be fused.

Furthermore, according to a method of using the honeycomb-type heating device of the present invention (second use method), it is possible to raise a temperature of the honeycomb substrate into which a catalyst for purifying exhaust gas is loaded up to a catalyst active temperature of the catalyst or more by causing each heater to generate heat by starting energization to each heater before the engine starts. Then, as a result, it becomes possible to efficiently purify a toxic component included in the exhaust gas by the activated catalyst from immediately after the engine starts.

MODE FOR CARRYING OUT THE INVENTION

Hereinafter, although the present invention will be described based on a specific embodiment, the present invention is not interpreted as being restricted to the embodiment, and the design can be appropriately modified or improved based on common knowledge of a person skilled in the art in a range not departing from the gist of the present invention.

Figure 1:
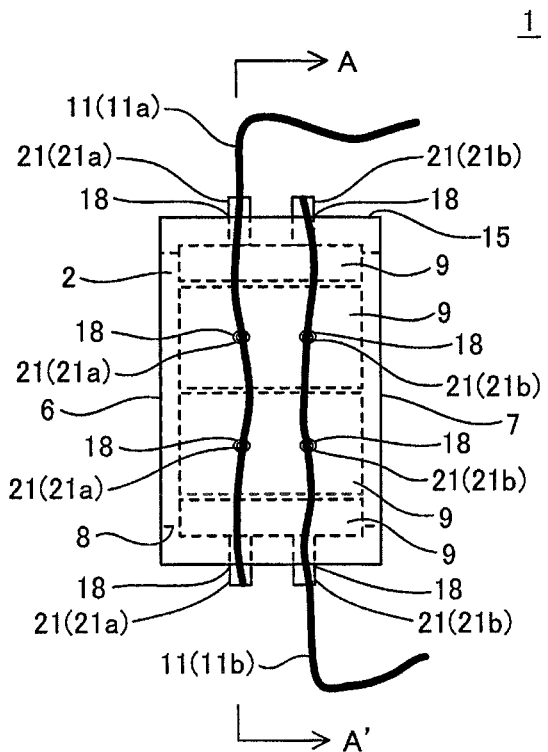
FIG. 1 is a schematic side view showing one example of an embodiment of a honeycomb-type heating device of the present invention.
Figure 2:
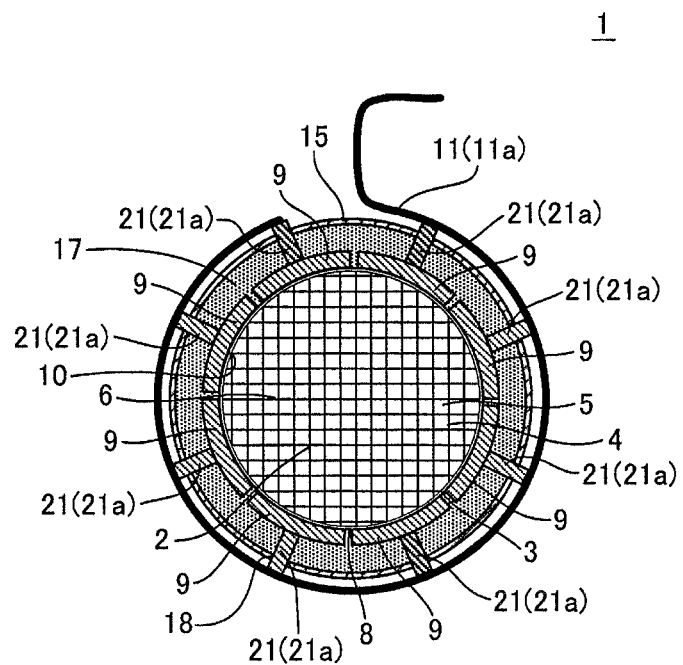
FIG. 2 is an A-A' cross section of FIG. 1.

(1) Honeycomb-type heating device:

FIG. 1 is a schematic side view showing one example of an embodiment of a honeycomb-type heating device of the present invention, and FIG. 2 is an A-A' cross section of FIG. 1. As shown in FIG. 1 and FIG. 2, a honeycomb-type heating device 1 of the present invention includes a honeycomb substrate 2, a plurality of heaters 9, a coated wire 11, and a metal case 15.

The honeycomb substrate 2 is pillar-shaped, has partition walls 4 defining and forming a plurality of cells 5 extending from one end face 6 to the other end face 7, and has a circumferential wall 3 surrounding the partition walls 4. The cells 5 serve as a through channel of fluid, such as exhaust gas. The plurality of heaters 9 are adjacently arranged on a circumferential face 8 in a circumferential direction of the circumferential face 8 that is an outer surface (a face on a side exposed to the outside) of the circumferential wall 3 of the honeycomb substrate 2. Each heater 9 has an electrode 21 for energization and is a resistance heating type heater that generates heat due to energization. The plurality of heaters 9 are electrically connected by the coated wire 11. In the present embodiment, as shown in FIG. 1, two coated wires 11a, 11b are disposed. Of the two coated wires, one coated wire 11a is connected to an electrode 21a on a positive pole side of each heater 9 and the other coated wire 11b is connected to an electrode 21b on a negative pole side of each heater 9. Each heater 9 is energized through the two coated wires 11a, 11b, and each heater 9 is caused to generate heat. The honeycomb substrate 2 and the plurality of heaters 9 are housed in the tubular metal case 15.

The metal case 15 has a hole part 18 for protruding the electrode 21 of each heater 9 to the outside of the metal case 15. The electrode 21 of each heater 9 protrudes to the outside of the metal case 15 through the hole part 18 of the metal case 15. The coated wire 11 is electrically connected to the electrode 21 of each heater 9 protruding to the outside of the metal case 15 at the outside of the metal case 15.

In the honeycomb-type heating device 1 of the present invention, the metal case 15 having a certain amount of heat capacity exists between portions (heat generating portions) other than the electrodes 21 of the plurality of heaters 9 and the coated wire 11. Hence, when the heater 9 generates heat, the temperature at the outside of the metal case 15 can be made lower than the temperature of the heater 9 by 200° C. or more. Therefore, in the honeycomb-type heating device 1 of the present invention in which the plurality of heaters 9 are connected at the outside of the metal case 15, the coated wire 11 is hard to be fused by heat of the heaters 9, even if the coated wire 11 having a small heat capacity is used as the connector for the connection.

Additionally, since the coated wire 11 has a low rigidity, force of constraint between the heaters 9 by the coated wire 11 is weak. Hence, when the honeycomb substrate 2 is heated by the heaters 9, the difference in thermal expansion between the honeycomb substrate 2 and the plurality of heaters 9 connected by the coated wire (connector) 11 can relax the stress generated between the honeycomb substrate 2 and the plurality of heaters 9. Then, as a result, it is possible to effectively prevent breakage of the honeycomb substrate 2 or contact failure between the heaters 9 and the coated wire 11 due to the stress.

In addition, in the honeycomb-type heating device 1 of the present invention, since the honeycomb substrate 2 is heated by the plurality of heaters 9, even if some heaters 9 are damaged and do not generate heat, the honeycomb substrate 2 can be heated by the remaining heaters 9 capable of generating heat.

Further, the plurality of heaters 9 used in the honeycomb-type heating device 1 of the present invention, although being adjacent to each other in the circumferential direction of the circumferential face 8 of the honeycomb substrate 2, are in a divided structure where they are divided from each other, and thus a large thermal stress is hard to be generated in each heater 9. Hence, the plurality of heaters 9 are hard to be damaged by a thermal stress and are excellent in durability, compared with a tubular and single heater as disclosed in Patent Document 2.

Figure 3:
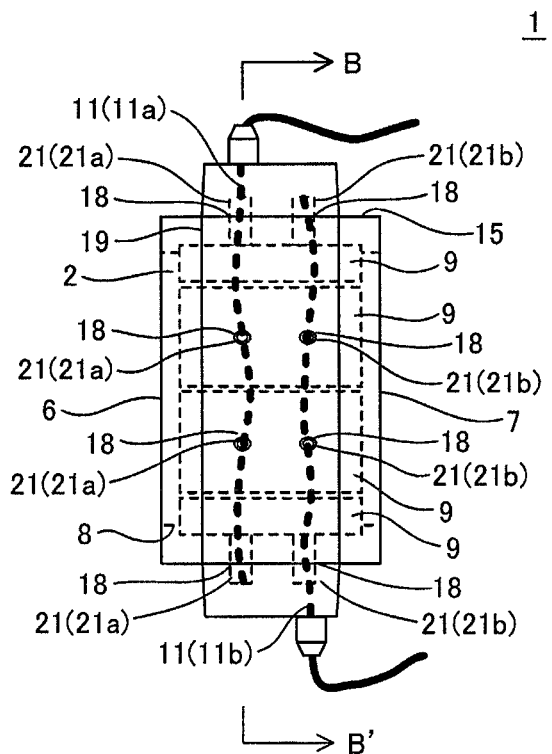
FIG. 3 is a schematic side view showing another example of the embodiment of the honeycomb-type heating device of the present invention.
Figure 4:
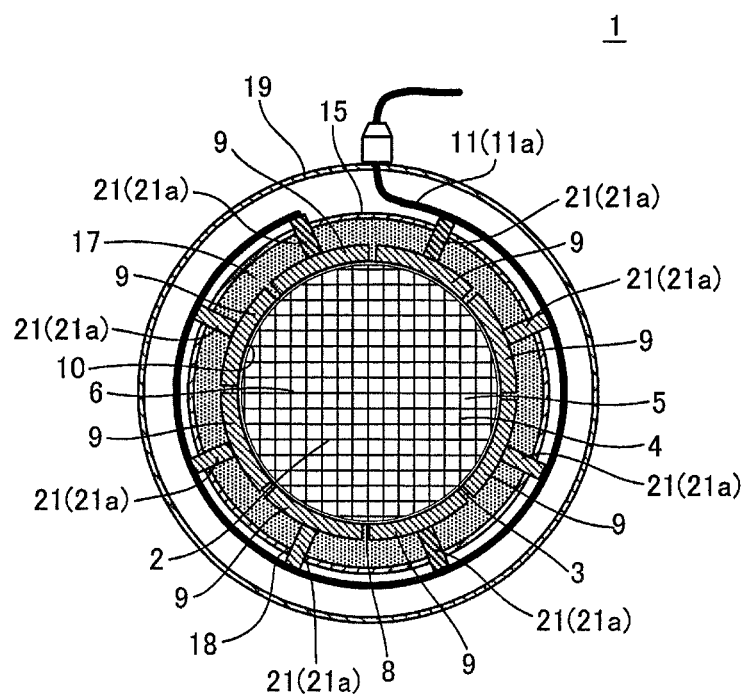
FIG. 4 is a B-B' cross section of FIG. 3.

FIG. 3 is a schematic side view showing another example of the embodiment of the honeycomb-type heating device of the present invention, and FIG. 4 is a B-B' cross section of FIG. 3. An embodiment shown in FIG. 3 and FIG. 4 is obtained by adding a cover 19 to the embodiment shown in FIG. 1 and FIG. 2. The cover 19 is provided so as to airtightly cover, outside the metal case 15, at least a connecting portion of the electrode 21 of each heater 9 and the coated wire 11 and the hole part 18 of the metal case 15. Providing such a cover 19 makes it possible to protect the connecting portion of the electrode 21 of each heater 9 and the coated wire 11 and to prevent exhaust gas or the like leaked out from the hole part 18 of the metal case 15 from further leaking out to the outside of the honeycomb-type heating device 1.

The number of heaters 9 used in the honeycomb-type heating device 1 of the present invention is any plural number and the upper limit number is not particularly restricted, but the number is preferably 2 to 8 in consideration of easy assembly or the like of the device. When a honeycomb substrate having a curved circumferential face (for example, a round pillar-shaped honeycomb substrate) is used, it is preferable that a recessed arched face 10 curved in the same degree as the circumferential face 8 of the honeycomb substrate 2 is formed on the heater 9, as shown in FIG. 2 and the like. The recessed arched face 10 is a face facing the circumferential face 8 of the honeycomb substrate 2. By formation of such a face 10, when the heater 9 is arranged on the circumferential face 8 of the honeycomb substrate 2, a gap is hard to be generated between the heater 9 and the circumferential face 8, and the heat of the heater 9 is efficiently transmitted to the honeycomb substrate 2.

In addition, the honeycomb-type heating device 1 of the present invention preferably has a portion where 50% or more of the circumferential face 8 is covered with the heaters 9, in the circumferential direction of the honeycomb substrate 2. Further, in the honeycomb-type heating device 1 of the present invention, the "portion where 50% or more of the circumferential face 8 is covered with the heaters 9, in the circumferential direction of the honeycomb substrate 2" preferably exists over a length of 60% or more of the total length of the honeycomb substrate 2 in the length direction of the honeycomb substrate 2. On the circumferential face 8 of the honeycomb substrate 2, a region covered with the heaters 9 is set in this manner, and thereby the honeycomb substrate 2 can be easily heated up to a target temperature.

When the honeycomb-type heating device 1 of the present invention is mounted and used in an automobile, usually the power supply used for an electric system of the automobile is commonly used for energization of the heater 9, and a power supply with a high voltage of, for example, 200 V is used. Hence, in the honeycomb-type heating device 1 of the present invention, the plurality of heaters 9 are electrically connected in series or in parallel, and each preferably have an electric resistance to allow application of a high voltage of 200 V or more. Here, the wording "allow application of a high voltage of 200 V or more" specifically means that it is possible to supply a current of about 25 A at the time of 200 V energization.

Note that, since the metallic heater has a low electric resistance, when such a power supply of a high voltage is used, excessive current may flow to damage a power circuit. Therefore, in the honeycomb-type heating device 1 of the present invention, it is preferable to use a ceramic heater having a heating resistor embedded inside a ceramic member. As a constituent material of the ceramic member, beryllia, aluminum nitride, silicon nitride, alumina, or the like can be suitably used. Additionally, as a constituent material of the heating resistor, silver (Ag), aluminum (Al), gold (Au), beryllium (Be), copper (Cu), magnesium (Mg), molybdenum (Mo), tungsten (W), ruthenium (Ru), platinum (Pt), or the like can be suitably used. In addition, the constituent material of the heating resistor may be a compound, and in this case, nitride, carbide, boride, silicide, or the like of zirconium (Zr), titanium (Ti), niobium (Nb), hafnium (Hf), tantalum (Ta), molybdenum (Mo), and tungsten (W) can be suitably used.

Figure 5:
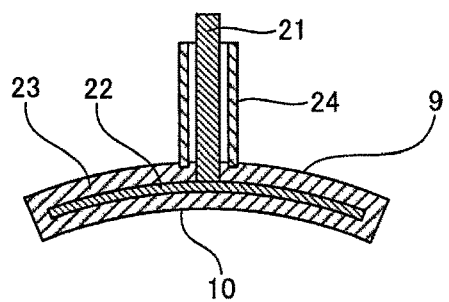
FIG. 5 is a schematic section view showing one example of a heater used in the honeycomb-type heating device of the present invention.

FIG. 5 is a schematic section view showing one example of a heater used in the honeycomb-type heating device of the present invention. The heater 9 is a ceramic heater having a heating resistor 22 embedded inside a ceramic member 23. The electrode 21 for energizing the heater 9 (heating resistor 22) is erected on the heating resistor 22. The electrode 21 may be made of the same material as that of the heating resistor 22 or may be made of a different material. The circumference of the electrode 21, excluding its tip vicinity part electrically connected with the coated wire 11, is preferably covered with a tubular insulating cover 24 made of an insulating material. The circumference of the electrode 21 is thus covered with the insulating cover 24, and thereby it becomes easy to ensure insulation properties between the electrode 21 and an inner periphery of the hole part 18 of the metal case 15. The insulating cover 24 preferably has an inner diameter of 1 mm or more and an outer diameter of 10 mm or less. In a case where the ceramic member 23 having the heating resistor 22 embedded therein is made of insulating ceramics, the material of the insulating cover 24 is preferably the same as that of the ceramic member 23.

In a case where the honeycomb substrate 2 used in the honeycomb-type heating device 1 of the present invention is formed of an electrically conductive material, each heater 9 preferably has an insulation function for preventing electric current from flowing from each heater 9 to the honeycomb substrate 2. If each heater 9 has the insulation function, even in a case where the honeycomb substrate 2 is formed of the electrically conductive material, it is possible to prevent electric current from flowing from each heater 9 to the honeycomb substrate to cause short circuit. One example of a method for providing each heater 9 with the insulation function includes a method for disposing a layered insulating material on a face facing the circumferential face 8 of the honeycomb substrate 2. As a material of the insulating material, silicon nitride, alumina, or the like can be suitably used.

Figure 8:
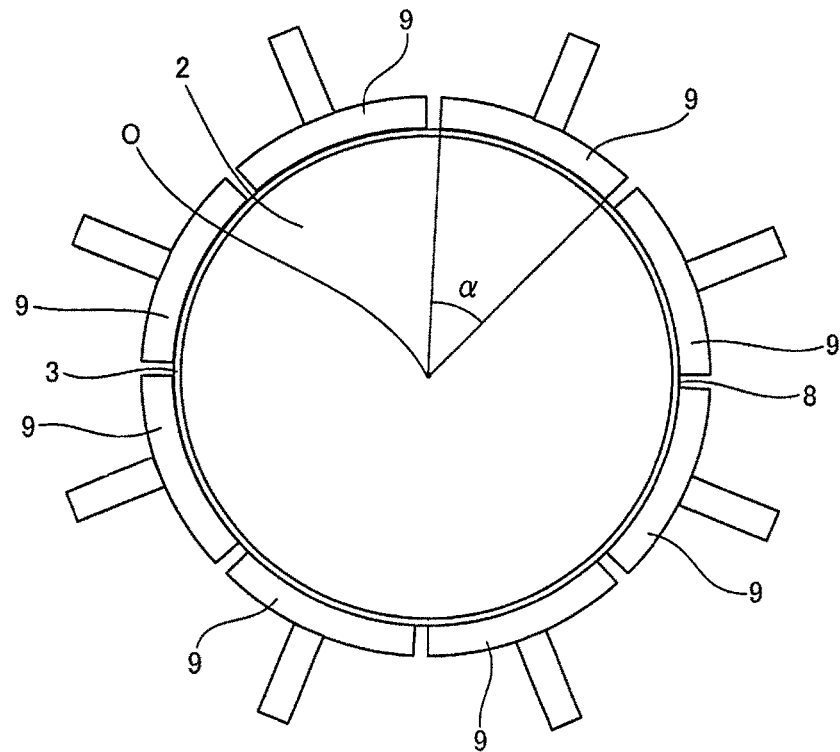
FIG. 8 is a schematic section view for explaining a center angle of the heater.

In the honeycomb-type heating device 1 of the present invention, on a cross section orthogonal to a length direction (in an axial direction) of the honeycomb substrate 2, a center angle a of each heater 9 arranged on the circumferential face 8 of the honeycomb substrate 2 is preferably 180° or less. Further, the center angle α is more preferably 10 to 180° and further more preferably 10 to 100°. Here, the wording "center angle α of each heater 9" is, as shown in FIG. 8, an angle formed by two line segments connecting both ends of each heater 9 and a center O of the honeycomb substrate 2 on a cross section orthogonal to the length direction of the honeycomb substrate 2. In addition, in a case where a circumferential shape of a cross section orthogonal to the length direction of the honeycomb substrate 2 is a circle, the wording "center O of the honeycomb substrate 2" means, as shown in FIG. 8, a center of the circle. Additionally, in a case where the circumferential shape of a cross section orthogonal to the length direction of the honeycomb substrate 2 is a shape other than the circle, it means a center of the maximum circle included in the cross section. When the center angle α of each heater 9 exceeds 180°, a gap is easily formed between the honeycomb substrate 2 and the heater 9. In addition, when the center angle α of each heater 9 is less than 10°, the area of the circumferential face 8 that can be covered by one heater 9 becomes narrow, and the number of heaters 9 required for heating the honeycomb substrate 2 up to the target temperature may be too many. Note that, in FIG. 8, the partition walls of the honeycomb substrate 2 are omitted.

Figure 6:
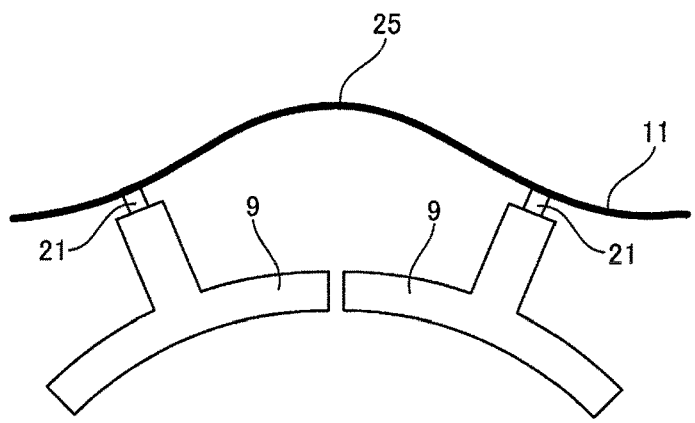
FIG. 6 is a schematic plane view showing one example of a stress relief part.

In the honeycomb-type heating device 1 of the present invention, the coated wire 11 is preferably provided with a stress relief part for relaxing a stress. The "stress relief part" mentioned here is a portion having a function of reducing the force of constraint between heaters by the coated wire, and when the honeycomb substrate is heated by the heaters, relaxing the stress generated by the difference in thermal expansion between the honeycomb substrate and the plurality of heaters connected by the coated wire. FIG. 6 is a schematic plane view showing one example of the stress relief part. In this example, the bent portion of the coated wire 11 serves as a stress relief part 25. That is, as shown in FIG. 6, if the coated wire 11 is bent between the electrodes 21 of the adjacent heaters 9, when the honeycomb substrate thermally expands, the interval between the adjacent heaters 9 is widened to relax the stress.

In the honeycomb-type heating device 1 of the present invention, a melting temperature of a conductor part of the coated wire 11 is preferably 400° C. or more, more preferably 800° C. or more, and particularly preferably 1000° C. or more. The coated wire 11, the melting temperature of which is high at the conductor part, is thus used, and thereby the coated wire 11 is hard to be fused. The material of the conductor part of the coated wire 11 is not particularly restricted, but it has a high heat resistance and a low electric resistance, and thus it is preferably formed by any one kind of metal material selected from a group consisting of nickel (Ni), Ni-based alloy, and stainless steel. In addition, a nickel-coated copper wire obtained by coating a copper wire with nickel is also preferably used for the conductor.

The diameter of the conductor part of the coated wire 11 is preferably 4.0 to 8.0 mm, more preferably 5.0 to 7.0 mm, and particularly preferably 6.0 to 7.0 mm. If the diameter of the conductor part of the coated wire 11 is less than 4.0 mm, the power density applied to the conductor is too high, and the conductor part may become easy to be fused. On the other hand, if the diameter of the conductor part of the coated wire 11 exceeds 8.0 mm, the rigidity of the coated wire 11 is too high, and the stress relaxing effect may not be sufficiently exerted.

The material of a coating material to coat the conductor of the coated wire 11 is not particularly restricted, but from the standpoint of insulation properties, heat resistance, and the like, the material is preferably a fluorine resin, such as PFA or PTFE, a glass-braided material, or a siliglass braided material.

The honeycomb substrate 2 used in the honeycomb-type heating device 1 of the present invention is preferably formed by a ceramic material having a thermal conductivity of 20 W/m·K or more, and more preferably formed by a ceramic material having a thermal conductivity of 50 W/m·K or more. Since the honeycomb substrate 2 is formed by such a material having a high thermal conductivity, the heat of the heater 9 can be efficiently transmitted to the honeycomb substrate 2, and the entire honeycomb substrate 2 can be caused to generate heat uniformly. Note that, in the present invention, the thermal conductivity of the honeycomb substrate is measured by a laser flash method.

As a constituent material of the honeycomb substrate 2, a material containing, as a main component, SiC (silicon carbide) excellent in thermal conductivity, heat resistance, and corrosion resistance, is preferable. Note that, the wording "main component" mentioned here means that the content is 50 mass % or more of the whole material. As a more concrete constituent material, a Si—SiC composite material, a (Si+Al)—SiC composite material, metal composite SiC, recrystallized SiC, $Si_3N_4$, SiC, or the like can be cited. However, when the porosity of the honeycomb substrate 2 is too high, a high thermal conductivity may not be obtained in some cases even if these materials are used, and therefore the honeycomb substrate 2 is preferably compact (porosity of about 0 to 5%). The Si—SiC composite material is formed compact by impregnating SiC with metal Si and exhibits high thermal conductivity and heat resistance, and therefore is particularly preferable as the constituent material of the honeycomb substrate 2.

The thickness of the circumferential wall 3 of the honeycomb substrate 2 is preferably larger than the thickness of the partition walls 4. In this way, the thickness of the circumferential wall 3 is made larger than the thickness of the partition walls 4, thus making it possible to increase the strength of the honeycomb substrate 2 and making it easy to ensure the strength necessary for the honeycomb substrate 2.

The thickness of the circumferential wall 3 of the honeycomb substrate 2 is not particularly limited, but is preferably 0.15 to 2.0 mm and more preferably 0.3 to 1.0 mm. The thickness of the circumferential wall 3 is made 0.15 mm or more, thus providing a sufficient mechanical strength of the honeycomb substrate 2 and making it possible to prevent damage of the honeycomb substrate 2 due to impact or thermal stress. Further, the thickness of the circumferential wall 3 is made 2.0 mm or less, thus making it possible to efficiently transmit heat of the heater 9 to the partition walls 4 through the circumferential wall 3.

The thickness of the partition walls 4 of the honeycomb substrate 2, too, is not particularly limited, but is preferably 0.1 to 1 mm and more preferably 0.2 to 0.5 mm. The thickness of the partition walls 4 is made 0.1 mm or more, thus providing a sufficient mechanical strength of the honeycomb substrate 2 and making it possible to prevent damage of the honeycomb substrate 2 due to impact or thermal stress. Further, the thickness of the partition walls 4 is made 1 mm or less, thus making it possible to prevent the pressure loss from becoming large when the fluid flows in the cell 5.

The cell density (the number of cells per unit sectional area) of the honeycomb substrate 2 is not particularly limited, but is preferably in a range of 25 to 2000 cells/square inch (4 to 320 cells/$cm^2$). The cell density is made 25 cells/square inch (4 cells/$cm^2$) or more, thus providing a sufficient strength of the partition walls 4, and eventually a sufficient strength and a sufficient effective GSA (geometric surface area) of the honeycomb substrate 2 itself. Further, the cell density is made 2000 cells/square inch (320 cells/$cm^2$) or less, thus making it possible to prevent the pressure loss from becoming large when the fluid flows in the cell 5.

The porosity of the honeycomb substrate 2 is preferably about 0 to 5%. The porosity of the honeycomb substrate 2 is set in such a range, thus making it easy to ensure the strength necessary for the honeycomb substrate 2 and making it possible to increase the thermal conductivity. Note that, the wording "porosity" mentioned here is a value measured by the Archimedes method.

The shape (outer shape) of the honeycomb substrate 2 is not particularly restricted except that it is pillar-shaped, and for example, the shape can be made, for example, round pillar-shaped, elliptic pillar-shaped, or polygonal pillar-shaped. In addition, the shape of the cell 5 (hereinafter, called a "cell shape") in a cross section perpendicular to the length direction of the honeycomb substrate 2, too, is not particularly restricted, but preferably a polygonal shape, such as a square shape, a hexagonal shape, or an octagon shape, or a combination thereof, for example, a combination of a square shape and an octagon shape or the like.

The diameter of a cross section (when the cross section has a shape other than a circle, the diameter of a circle circumscribed to the cross section) perpendicular to the length direction of the honeycomb substrate 2 is not particularly restricted, but preferably 300 mm or less and more preferably 200 mm or less. The diameter of a cross section perpendicular to the length direction of the honeycomb substrate 2 is set in such a range, thus making it possible to efficiently transmit heat of the heater 9 to the partition walls 4 inside the honeycomb substrate 2.

Figure 7:
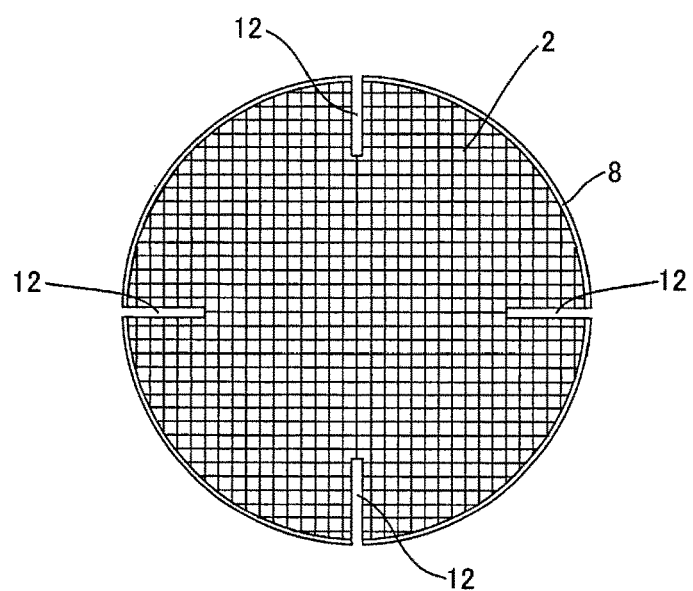
FIG. 7 is a schematic plane view showing one example of a honeycomb substrate formed with a stress relief.

The honeycomb substrate 2 is preferably formed with a stress relief. Forming the stress relief enables stress relief inside the honeycomb substrate 2. The typical stress relief includes, for example, as shown in FIG. 7, a slit 12 cut from the circumferential face 8 of the honeycomb substrate 2 toward the inside direction. However, the stress relief is not restricted to such a slit 12, but a publicly known stress relief can be formed in a range not departing from the present invention.

In a case where the honeycomb-type heating device 1 of the present invention is installed and used in an exhaust path of exhaust gas emitted from an engine, it is preferable to load a catalyst for purifying exhaust gas on the partition walls 4 of the honeycomb substrate 2. When the catalyst is loaded on the partition walls 4 in this way, a toxic substance, such as CO, $NO_x$, or HC in the exhaust gas can be changed to a harmless substance by catalytic reaction. Here, the type of a catalyst to be loaded on the partition walls 4 of the honeycomb substrate 2 is not particularly restricted, but, for example, in a case where it is used in an application for purifying exhaust gas of an automobile, it is preferable to use a noble metal. As the noble metal, platinum, rhodium or palladium, or a combination of these is preferable. The loaded amount of the noble metal is preferably 0.1 to 5 g/L per unit volume of the honeycomb substrate 2.

To load the catalyst in a highly dispersed state on the partition walls 4, the catalyst, such as a noble metal, is preferably once loaded on particles (carrier fine particles) of heat-resistant inorganic oxide having a large specific surface area, such as alumina, and then is loaded on the partition walls 4 of the honeycomb substrate 2 together with the particles.

In the honeycomb-type heating device 1 of the present invention, the material of the metal case 15 and the cover 19 preferably is, for example, stainless steel, and particularly preferably is chromium based or chrome-nickel based stainless steel.

Further, in the honeycomb-type heating device 1 of the present invention, as shown in FIG. 2 and FIG. 4, it is preferable to dispose a heat insulating material 17 between each heater 9 and the metal case 15. The heat insulating material 17 is thus disposed to make the heat of the heater 9 hard to escape to the outside, thus making it possible to efficiently transmit the heat of the heater 9 to the honeycomb substrate 2. The material of the heat insulating material 17 is not particularly restricted, but a ceramic fiber mat is preferably used because it has high heat-insulation properties and can be easily disposed between each heater 9 and the metal case 15 by being wound around the circumference of the honeycomb substrate 2 including the heaters 9. Note that, since the coated wire 11 is electrically connected with the electrode 21 of each heater 9 at the outside of the metal case 15, even if the heat insulating material 17 inside the metal case 15 absorbs water to lower the electrical insulation of the heat insulating material 17, accident due to electrical leakage or short circuit is hard to occur.

Use application and usage pattern of the honeycomb-type heating device 1 of the present invention are not particularly restricted, but from the standpoint of effectively utilizing its effects, the honeycomb-type heating device 1 is preferably installed and used in the exhaust path of exhaust gas emitted from the engine. Then, in that case, the honeycomb-type heating device 1 of the present invention is preferably used for raising the temperature of the honeycomb substrate 2 into which a catalyst for purifying exhaust gas is loaded up to a catalyst active temperature of the catalyst or more by causing each heater 9 to generate heat by starting energization to each heater 9 before the engine starts. The honeycomb-type heating device 1 of the present invention is used in this way, thus making it possible to efficiently purify a toxic component included in the exhaust gas by the activated catalyst from immediately after the engine starts.

(2) A method of manufacturing a honeycomb-type heating device:

One example of a method of manufacturing a honeycomb-type heating device of the present invention will be described. First, to prepare a honeycomb substrate, a forming raw material containing a ceramic raw material is prepared. As the ceramic raw material, powder capable of forming ceramics exemplified before as the material of the honeycomb substrate can be suitably used. For example, in a case where the Si—SiC composite material is employed as the constituent material of the honeycomb substrate, SiC powder is preferably used as the ceramic raw material. The forming raw material is preferably prepared by mixing such a ceramic raw material with an additive, such as a dispersing medium, an organic binder, an inorganic binder, or a surfactant, as needed.

Next, the forming raw material is kneaded to form a pillar-shaped kneaded material. The method of kneading a forming raw material to form a kneaded material is not particularly limited. The suitable method includes, for example, a method using a kneader, a vacuum pugmill, or the like.

After that, a die formed with a grid-like slit is used to extrude a honeycomb formed body having partition walls and a circumferential wall from the kneaded material, and the honeycomb formed body is dried. The drying method is not particularly restricted. The suitable drying method includes, for example, hot-air drying, microwave drying, dielectric drying, reduced-pressure drying, vacuum drying, freeze drying, and the like. Among these, dielectric drying, microwave drying, and hot-air drying are preferably performed singly or in combination.

Subsequently, the honeycomb formed body after the drying (honeycomb dried body) is fired to prepare a honeycomb substrate. Note that, before the firing (main firing), calcination (degreasing) is preferably performed to remove binder or the like included in the honeycomb formed body. The condition for calcination is not particularly restricted and may be a condition capable of removing (burning) an organic substance (such as an organic binder) included in the honeycomb formed body. The condition (temperature, time, atmosphere, and the like) for firing (main-firing) the honeycomb formed body is different depending on a type of the forming raw material, and therefore an adequate condition may be selected according to the type. For example, in a case of preparing a honeycomb substrate formed from the Si—SiC composite material, metal Si in a billet state is placed on the honeycomb formed body including the SiC powder and fired in an inert gas with pressure reduced or in a vacuum, and then the metal Si is impregnated into the honeycomb formed body. By the firing, a compact (low-porosity) honeycomb substrate in which the metal Si is filled in a gap between the SiC particles can be obtained. Note that, the honeycomb substrate may be formed with a stress relief, such as a slit, as needed.

In addition, in a case where a catalyst for purifying exhaust gas is loaded on the partition walls of the honeycomb substrate, for example, aqueous solution including a catalytic component, such as a noble metal, is preliminarily impregnated into ceramics powder to become carrier fine particles, and then the ceramics powder is dried and fired to give catalyst-coated fine particles. A dispersing medium (such as water) and the other additive are added to the thus obtained catalyst-coated fine particles to prepare a coating liquid (slurry). Then, the slurry is coated on the partition walls of the honeycomb substrate by using a conventionally known coating method, such as a suction method, and then dried and fired to load the catalyst on the partition walls of the honeycomb substrate.

Next, a heater is prepared. Note that, a preparing method described below is one example of a method of preparing a ceramic heater that is one kind of a resistance heating type heater. First, a sintering agent, a binder, and the like are appropriately added to the ceramic raw material, such as aluminum nitride, silicon nitride, or alumina, to give a forming raw material for heater. A plate formed body curved in the same degree as the circumferential face of the honeycomb substrate is prepared from the forming raw material for heater and fired, and thus a ceramic plate is prepared. On the surface of the ceramic plate, the heating resistor is printed and then the ceramic plate is fired again. As the heating resistor, the one composed of silver (Ag), aluminum (Al), gold (Au), beryllium (Be), copper (Cu), magnesium (Mg), molybdenum (Mo), tungsten (W), ruthenium (Ru), platinum (Pt), or the like can be preferably used. Further, the heating resistor may be the one composed of a compound, and in this case, the one composed of nitride, carbide, boride, silicide, or the like of zirconium (Zr), titanium (Ti), niobium (Nb), hafnium (Hf), tantalum (Ta), molybdenum (Mo), or tungsten (W) can be preferably used.

Next, on the heating resistor, a rod-like electrode is erected so as to be electrically connected with the heating resistor. Subsequently, a hole part for inserting an electrode is provided in a ceramic plate prepared by the same method as that of the above-described ceramic plate, and the ceramic plate is overlapped with and bonded to the above-described ceramic plate having the heating resistor printed thereon. Further, as needed, a tubular insulating cover is prepared and is arranged on and bonded to the ceramic plate provided with the hole part for inserting an electrode so as to surround the electrode. In this way, the ceramic heater having a recessed arched face curved in the same degree as the circumferential face of the honeycomb substrate can be obtained.

A plurality of the ceramic heaters thus obtained are adjacently arranged in the circumferential direction of the circumferential face of the honeycomb substrate so as to surround the circumferential face, and the recessed arched face of each ceramic heater is caused to contact the circumferential face of the honeycomb substrate. After that, a ceramic fiber mat (heat insulating material) is wound around the circumference of the honeycomb substrate including the heaters, and they are housed in the metal case having hole parts for protruding the electrodes of heaters to the outside. Next, outside the metal case, the electrodes of heaters protruded from the hole parts of the metal case to the outside of the metal case are electrically connected by the coated wire. Further, as needed, outside the metal case, a cover is provided which airtightly covers at least a connecting portion of the electrode of each heater and the coated wire and the hole parts of the metal case.

Thus, the honeycomb-type heating device of the present invention which can be installed in an exhaust path or the like of exhaust gas emitted from an engine can be obtained.
(3) A method of using a honeycomb-type heating device (first use method):

A honeycomb-type heating device used in a method of using a honeycomb-type heating device (first use method) of the present invention is the above-mentioned honeycomb-type heating device 1 of the present invention. In the use method, the honeycomb-type heating device 1 of the present invention is used under the temperature condition that the temperature of the coated wire 11 is 600° C. or less. Such a temperature condition can be realized by adjusting, for example, a temperature of the heater, a heat capacity of the metal case, a thickness of the heat insulating material, and the like. In this way, the honeycomb-type heating device 1 of the present invention is used under the temperature condition that the temperature of the coated wire 11 is 600° C. or less, and thereby the coated wire 11 is hard to be fused. Note that, in the use method, the honeycomb-type heating device 1 of the present invention is preferably used under the temperature condition that the temperature of the coated wire 11 is 500° C. or less, and more preferably used under the temperature condition of 400° C. or less.
(4) A method of using a honeycomb-type heating device (second use method):

A honeycomb-type heating device used in a method of using a honeycomb-type heating device (second use method) of the present invention is the above-mentioned honeycomb-type heating device 1 of the present invention in which the catalyst for purifying exhaust gas is loaded into the honeycomb substrate. In the use method, the honeycomb-type heating device 1 in which the catalyst for purifying exhaust gas is loaded into the honeycomb substrate is installed in an exhaust path of exhaust gas emitted from an engine. Then, the temperature of the honeycomb substrate 2 into which a catalyst for purifying exhaust gas is loaded is raised up to a catalyst active temperature of the catalyst or more by causing each heater 9 to generate heat by starting energization to each heater 9 before the engine starts. According to the use method, it is possible to efficiently purify a toxic component included in the exhaust gas by the activated catalyst from immediately after the engine starts.

EXAMPLES

The present invention will be described below further in detail based on Examples, but the present invention is not restricted to these Examples.

Example 1

The forming raw material for the honeycomb substrate was prepared by adding binder and water to the SiC powder, and the raw material was kneaded in the vacuum pugmill to give a round pillar-shaped kneaded material. The round pillar-shaped honeycomb formed body that has partition walls defining and forming a plurality of cells extending from one end face to the other end face, and that has a circumferential wall surrounding the partition walls was obtained by extrusion from the kneaded material. After that, a honeycomb dried body was obtained by drying the honeycomb formed body with microwave and hot air. Then, metal Si in a billet state was placed on the honeycomb dried body, and they were fired in a vacuum furnace to give a honeycomb substrate formed from the Si—SiC composite material. The honeycomb substrate thus obtained was round pillar-shaped with the diameter of 90 mm and the length of 75 mm, the area of the circumferential face was 21195 mm$^2$, the thickness of the circumferential wall was 0.3 mm, the thickness of the partition walls was 0.15 mm, the cell shape was square, and the cell density was 400 cells/cm$^2$. In addition, the porosity of the honeycomb substrate was 5%.

Next, a forming raw material for heater was prepared by adding binder and water to the $Si_3N_4$ powder. A plate formed body curved in the same degree as the circumferential face of the honeycomb substrate was prepared from the forming raw material for heater, and a ceramic plate was prepared by firing the plate formed body. A heating resistor composed of platinum was printed on the surface of the ceramic plate, and then the ceramic plate was fired again. Then, a rod-like electrode was erected on the heating resistor so as to be electrically connected with the heating resistor. Subsequently, a hole part for inserting an electrode was provided in a ceramic plate prepared by the same method as that of the above-described ceramic plate, and the ceramic plate was overlapped on and bonded to the ceramic plate having the heating resistor printed thereon. Further, a tubular insulating cover was prepared, and the cover was arranged on and bonded to the ceramic plate provided with the hole part for inserting an electrode so as to surround the electrode. In this way, a ceramic heater was obtained which has a recessed arched face curved in the same degree as the circumferential face of the honeycomb substrate. The recessed arched face of the heater was 10 mm in width (length of the arched portion) and 65 mm in length (length in a direction perpendicular to the arched portion), Subsequently, eight heaters obtained as described above were adjacently arranged on the circumferential face in a circumferential direction of the circumferential face of the honeycomb substrate, and the recessed arched face of each heater was caused to contact the circumferential face of the honeycomb substrate. At this time, the arrangement of the heaters was adjusted to make equal all intervals between the adjacent heaters in the circumferential direction of the circumferential face of the honeycomb substrate. Then, an alumina fiber mat (heat insulating material) was wound around the circumference of the honeycomb substrate including the heaters, and they were housed in the metal case having hole parts for protruding the electrodes of heaters to the outside. Next, outside the metal case, the electrodes of heaters protruded to the outside of the metal case from the hole parts of the metal case were electrically connected by the coated wire. The used coated wire is 7.0 mm in diameter of the conductor part, the conductor is composed of nickel, and the coating material is composed of a siliglass braided material. Further, outside the metal case, a cover was provided which airtightly covered a connecting portion of the electrode of each heater and the coated wire and the hole part of the metal case to give the honeycomb-type heating device of Example 1.
(Evaluation)

A cycle of applying power of 7.5 W for 40 seconds to each of ten honeycomb-type heating devices thus obtained was repeated for 10 cycles. After that, the number of honeycomb-type heating devices in which energization failure of the heater occurred was checked and its result was shown in Table 1.

Example 2

A honeycomb-type heating device of Example 2 was obtained similarly to Example 1 except that the diameter of the conductor part of the coated wire was set to 5.4 mm. For 10 honeycomb-type heating devices thus obtained, with the method similar to Example 1, the number of honeycomb-type heating devices in which energization failure of the heater occurred was checked and its result was shown in Table 1.

Example 3

A honeycomb-type heating device of Example 3 was obtained similarly to Example 1 except that the material of the conductor of the coated wire was a nickel-coated copper wire. For 10 honeycomb-type heating devices thus obtained, with the method similar to Example 1, the number of honeycomb-type heating devices in which energization failure of the heater occurred was checked and its result was shown in Table 1.

Example 4

A honeycomb-type heating device of Example 4 was obtained similarly to Example 3 except that the diameter of the conductor part of the coated wire was set to 5.4 mm. For 10 honeycomb-type heating devices thus obtained, with the method similar to Example 1, the number of honeycomb-type heating devices in which energization failure of the heater occurred was checked and its result was shown in Table 1.

Comparative Example

Figure 9:
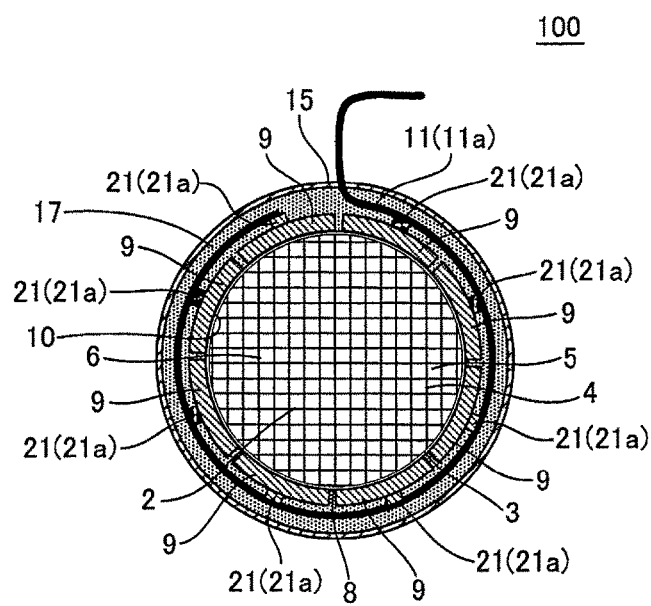
FIG. 9 is a schematic section view showing a honeycomb-type heating device of Comparative Example.

As shown in FIG. 9, a honeycomb-type heating device 100 of Comparative Example was obtained similarly to Example 1 except that inside the metal case 15, the electrodes 21 of heaters 9 were electrically connected by the coated wire 11, and the cover was not provided outside the metal case 15. For 10 honeycomb-type heating devices thus obtained, with the method similar to Example 1, the number of honeycomb-type heating devices in which energization failure of the heater occurred was checked and its result was shown in Table 1.

TABLE 1

|  | DIAMETER OF CONDUCTOR PART OF COATED WIRE (mm) | MATERIAL OF CONDUCTOR OF COATED WIRE | NUMBER OF OCCURRENCES OF ENERGIZATION FAILURE (PIECES) *1 |
|---|---|---|---|
| EXAMPLE 1 | 7.0 | NICKEL | 0 |
| EXAMPLE 2 | 5.4 | NICKEL | 1 |
| EXAMPLE 3 | 7.0 | NICKEL-COATED COPPER WIRE | 2 |
| EXAMPLE 4 | 5.4 | NICKEL-COATED COPPER WIRE | 3 |
| COMPARATIVE EXAMPLE | 7.0 | NICKEL | 9 |

*1 Among 10 honeycomb-type heating devices, the number of honeycomb-type heating devices in which energization failure occurred.

(Consideration)

As shown in Table 1, in Examples 1 to 4 in which the electrodes of heaters were electrically connected outside the metal case, the number of honeycomb-type heating devices in which energization failure occurred was 3 or less among 10 pieces. On the other hand, in Comparative Example in which the electrodes of heaters were electrically connected inside the metal case, the number of honeycomb-type heating devices in which energization failure occurred was 9 among 10 pieces. Note that, any of causes of energization failure was meltdown of the conductor of the coated wire. In addition, as seen from comparison between Example 1 and Example 2 and comparison between Example 2 and Example 3, when the materials of the conductors of the coated wire were the same, the coated wire with the larger diameter of the conductor part had a smaller number of occurrences of energization failure. It is considered that this is because since the coated wire with the larger diameter of the conductor part has a larger heat capacity and has a lower power density applied thereto, the temperature rise of the coated wire is suppressed and the coated wire is hard to be fused.

INDUSTRIAL APPLICABILITY

The present invention can be suitably utilized as a honeycomb-type heating device that is installed in an exhaust path of exhaust gas emitted from an engine of an automobile or the like, for raising a temperature of a catalyst for purifying the exhaust gas up to the active temperature of the catalyst at an early stage and as its use method.

DESCRIPTION OF REFERENCE NUMERALS

1: honeycomb-type heating device, 2: honeycomb substrate, 3: circumferential wall, 4: partition wall, 5: cell, 6:

one end face, 7: the other end face, 8: circumferential face, 9: heater, 10: recessed arched face (a face facing the circumferential face of the honeycomb substrate), 11: coated wire, 11a: coated wire, 11b: coated wire, 12: slit, 15: metal case, 17: heat insulating material, 18: hole part, 19: cover, 21: electrode, 21a: electrode, 21b: electrode, 22: heating resistor, 23: ceramic member, 24: insulating cover, 25: stress relief part, 100: honeycomb-type heating device (Comparative Example), O: center, and α: center angle.

The invention claimed is:

1. A honeycomb-type heating device comprising:
   a pillar-shaped honeycomb substrate that has partition walls defining and forming a plurality of cells extending from one end face to another end face, and that has a circumferential wall surrounding the partition walls;
   a plurality of heaters adjacently arranged on a circumferential face in a circumferential direction of the circumferential face that is an outer surface of the circumferential wall;
   a coated wire electrically connecting the plurality of heaters; and
   a metal case housing the honeycomb substrate and the plurality of heaters, wherein
   each of the plurality of heaters has an electrode for energization and is a resistance heating type heater that generates heat due to energization,
   the metal case has hole parts for protruding the electrodes of respective heaters to the outside of the metal case, and
   the coated wire electrically connects, outside the metal case, the electrodes of respective heaters protruding to the outside of the metal case from the hole parts.

2. The honeycomb-type heating device according to claim 1, further comprising a cover provided so as to airtightly cover, at the outside of the metal case, at least a connecting portion of the electrode of each of the plurality of heaters and the coated wire and the hole part of the metal case.

3. The honeycomb-type heating device according to claim 1, wherein the coated wire is provided with a stress relief part.

4. The honeycomb-type heating device according to claim 3, wherein the stress relief part is a bent portion of the coated wire.

5. The honeycomb-type heating device according to claim 1, wherein a melting temperature of a conductor of the coated wire is 400° C. or more.

6. The honeycomb-type heating device according to claim 1, wherein the conductor of the coated wire is formed by any one kind of metal material selected from a group consisting of Ni, Ni-based alloy, and stainless steel.

7. The honeycomb-type heating device according to claim 1, wherein the honeycomb substrate is formed by a ceramic material having a thermal conductivity of 20 W/m·K or more.

8. The honeycomb-type heating device according to claim 1, wherein the plurality of heaters are electrically connected in series or in parallel and each have an electric resistance to allow application of a high voltage of 200 V or more.

9. The honeycomb-type heating device according to claim 1, wherein each of the plurality of heaters has an insulation function for preventing an electric current from flowing from each of the plurality of heaters to the honeycomb substrate.

10. The honeycomb-type heating device according to claim 1, wherein at a cross section orthogonal to a length direction of the honeycomb substrate, a center angle of each of the plurality of heaters arranged on the circumferential face of the honeycomb substrate is 180° or less.

11. The honeycomb-type heating device according to claim 1, wherein a thickness of the circumferential wall is larger than a thickness of the partition walls.

12. The honeycomb-type heating device according to claim 1, wherein the honeycomb substrate has a stress relief formed therein.

13. The honeycomb-type heating device according to claim 1, wherein a catalyst for purifying exhaust gas is loaded into the honeycomb substrate.

14. A method of using a honeycomb-type heating device, comprising:
    installing the honeycomb-type heating device according to claim 13 in an exhaust path of exhaust gas emitted from an engine; and
    raising a temperature of the honeycomb substrate into which a catalyst for purifying exhaust gas is loaded up to a catalyst active temperature of the catalyst or more by causing each of the plurality of heaters to generate heat by starting energization to each of the plurality of heaters before the engine starts.

15. A method of using a honeycomb-type heating device, using the honeycomb-type heating device according to claim 1 under a temperature condition that a temperature of the coated wire is 600° C. or less.

* * * * *